(12) United States Patent
Bharatia et al.

(10) Patent No.: US 8,346,927 B2
(45) Date of Patent: ***Jan. 1, 2013

(54) METHOD AND SYSTEM FOR SERVICE DENIAL AND TERMINATION ON A WIRELESS NETWORK

(75) Inventors: Jayshree Bharatia, Plano, TX (US); Marvin Bienn, Dallas, TX (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/435,320

(22) Filed: Mar. 30, 2012

(65) Prior Publication Data

US 2012/0191854 A1 Jul. 26, 2012

Related U.S. Application Data

(63) Continuation of application No. 10/920,850, filed on Aug. 18, 2004, now Pat. No. 8,161,098.

(60) Provisional application No. 60/496,071, filed on Aug. 18, 2003.

(51) Int. Cl.
*G06F 15/173* (2006.01)
*G06F 15/16* (2006.01)
(52) U.S. Cl. .................. 709/225; 709/227; 709/229
(58) Field of Classification Search .................. 709/225, 709/227, 228, 229
See application file for complete search history.

(56) References Cited

U.S. PATENT DOCUMENTS

| 6,625,141 | B1 | 9/2003 | Glitho et al. |
| 6,798,755 | B2 | 9/2004 | Lillie et al. |
| 7,035,213 | B2 | 4/2006 | Moran et al. |
| 8,161,098 | B2 * | 4/2012 | Bharatia et al. ............... 709/203 |
| 2002/0146900 | A1 | 10/2002 | Surprenant et al. |
| 2004/0047339 | A1 | 3/2004 | Wang et al. |
| 2004/0107143 | A1 | 6/2004 | Niemi |
| 2004/0111476 | A1 | 6/2004 | Trossen et al. |
| 2004/0230659 | A1 | 11/2004 | Chase |

FOREIGN PATENT DOCUMENTS

| CN | 1357190 | 7/2002 |
| WO | WO 02/32165 A1 | 4/2002 |

OTHER PUBLICATIONS

"Digital Cellular Telecommunications System (Phase 2+)", Universal Mobile Telecommunications System (UMTS); (3GPP TS 24.228 version 5.1.0 Release 5); ETSI TS 124 228 V5.1.0, Jun. 1, 2002, pages-complete, XP002235159.

(Continued)

*Primary Examiner* — Kristie Shingles
(74) *Attorney, Agent, or Firm* — Wolfe-SBMC

(57) ABSTRACT

A method and system are provided for denying an application service request, such as a Multimedia Messaging Service (MMS) request, on wireless and wireline Internet Protocol (IP) Multimedia Subsystem (IMS) networks or Session Initiation Protocol (SIP) networks. In one example, the method includes receiving a request for an application service from a user via a transport network, determining to deny the request, and providing a response corresponding to the denial of the request to the user via the transport network.

15 Claims, 3 Drawing Sheets

OTHER PUBLICATIONS

Nokia; "SIP Based Technology Solutions for MMS"; 3GPP TSG-T2 SWG 3 adhoc, Jun. 27, 2001; XP002297061; whole document.
Chinese Office Action dated Feb. 17, 2011; Chinese Application No. 20048002359.1; .7 pages.
"Final Office Action", U.S. Appl. No. 10/920,850, (Jan. 4, 2011),8 pages.
"International Search Report and Written Opinion", Application No. PCT/IB2004/002692, (Nov. 29, 2004),10 pages.
"Non-Final Office Action", U.S. Appl. No. 10/920,850, (Apr. 2, 2008),8 pages.
"Notice of Allowance", U.S. Appl. No. 10/920,850, (Dec. 13, 2011),10 pages.
"Supplemental Non-Final Office Action", U.S. Appl. No. 10/920,850, (May 19, 2010),8 pages.

\* cited by examiner

METHOD AND SYSTEM FOR SERVICE DENIAL AND TERMINATION ON A WIRELESS NETWORK

CROSS REFERENCE

This application claims priority to U.S. patent application Ser. No. 10/920,850, filed on Aug. 18, 2004, entitled "METHOD AND SYSTEM FOR SERVICE DENIAL AND TERMINATION ON A WIRELESS NETWORK," which claims the benefit of U.S. Provisional Patent Application Ser. No. 60/496,071, filed Aug. 18, 2003, the disclosures of which are incorporated by reference in their entirety.

BACKGROUND

Data transfer, including wireless and wireline messaging, is a service that has become increasingly important to subscribers. Existing service providers, such as providers of wireless and wireline voice services, as well as companies catering specifically to wireless data needs, provide data services and plans. Some subscribers may obtain a data package that is part of a total package that may include wireless voice services and other services. Other subscribers, for example those using a personal digital assistant (PDA) that is not equipped to accept voice calls, may require only wireless data services.

Existing networks allow users of devices such as wireless phones, two way pagers, and computers to exchange simple text based messages with other subscribers and, in some cases, with users who may not be a part of the same network or who may only have access to traditionally land-based services such as email. The complexity of the type of messages being sent, as well as the content of the messages, has increased as the sophistication of the networks has increased. For example, newer wireless and wireline networks generally provide support for the exchange of photographs and multimedia presentations between wireless users and between wireless users and wireline users.

Networking and wireless standards have been developed to provide functionality for multimedia capable devices and to allow interaction between the new devices and legacy devices and systems. For example, application servers have been introduced into networks under the 3G and 3GPP2 standards, such as internet protocol (IP) multimedia subsystem (IMS) based networks, to support multimedia applications and communications. However, despite these developments, existing standards and technologies have failed to adequately address all of the technology needs brought on by the data transfer requirements of the multimedia capable devices.

SUMMARY

In one embodiment, the present disclosure introduces a method for denying a Multimedia Messaging Service (MMS) request on a Session Initiation Protocol (SIP) based network. The method includes receiving a request for an application service from a user via a transport network. The method determines to deny the request and provides a response, which corresponds to the denial of the request, to the user.

In another embodiment, the present disclosure introduces a system for servicing MMS requests on an SIP-based network. The system comprises an SIP registrar in communication with a transport network. The SIP registrar is configured to receive registration information from a user and register the user on the transport network. The system also comprises an MMS server in communication with the transport network. The MMS server is configured to receive a service request from the user via the SIP registrar and provide a response to the request via the SIP registrar.

In still another embodiment, the present disclosure includes a method for servicing application service requests on an IMS (IP multimedia subsystem) network. The method includes receiving a registration request at an IMS registrar from an application user agent (AUA). A registration confirmation may be sent from the IMS registrar to the AUA and a user associated with the AUA may be registered on a transport network if the registration request provides proper credential information. If the registration request does not provide proper credential information, the method includes sending a notice of registration failure from the IMS registrar to the AUA. The method forwards a request for an application service received by the IMS registrar from the AUA to an application server (AS) if the registration request provides proper credential information. At the application server, a determination may be made to deny the application service request and a notice of denial may be sent to the IMS registrar and the AUA. A confirmation of denial from the AUA may be received at the application server.

The foregoing has outlined features of several embodiments so that those skilled in the art may better understand the detailed description that follows. Additional features will be described below that may further form the subject of the claims herein. Those skilled in the art should appreciate that they can readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure.

DETAILED DESCRIPTION

Figure 1:
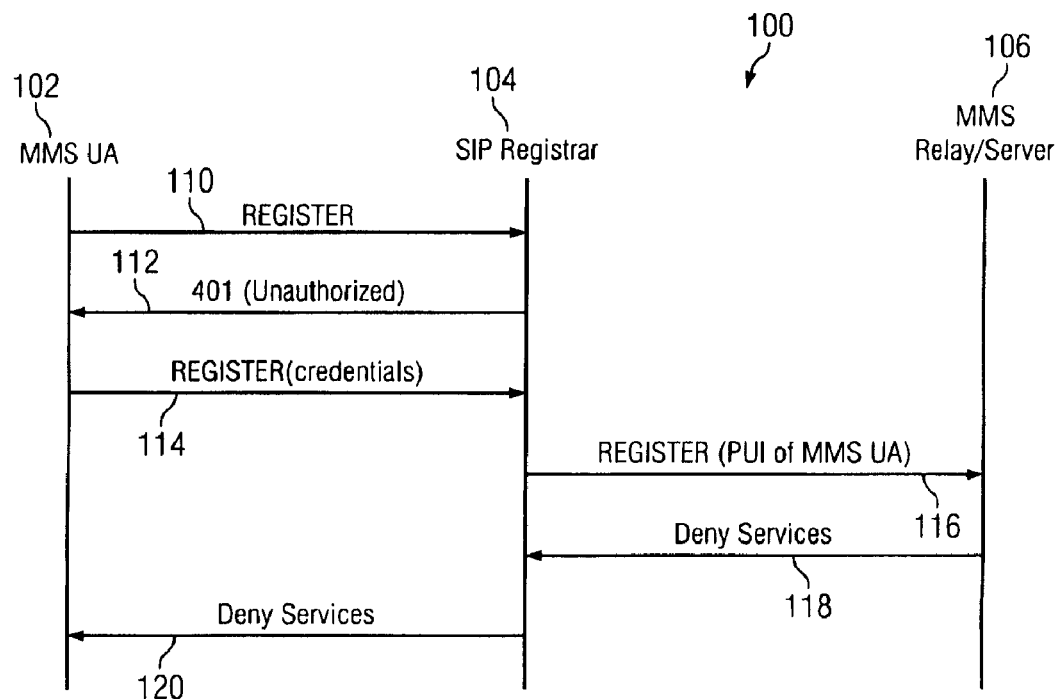
FIG. 1 illustrates a message sequence chart of one embodiment of a method for denying service to a user of a wireless network.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The present disclosure is related to and hereby incorporates in its entirety, MMS MM1 Stage 3 Using SIP, available at http://www.3gpp2.org/Public_html/specs/ under the document name X.S0016-312-0 v1.0. However, it is understood that the present disclosure may be applied to any application server (AS) operating in an internet protocol (IP) multimedia subsystem (IMS) network as defined, for example, under the 3GPP and 3GPP2 standards. For purposes of illustration, the present disclosure frequently uses the Multimedia Messaging Service (MMS) standard as a particular example of a Session Initiation Protocol (SIP) AS, but it is understood that the disclosure is not limited to MMS and may be applied to other SIP application servers, as well as other IMS application servers. Furthermore, as SIP may be used to provide a transport layer-independent way to exchange data and provide other services, such as voice or phone services, the present disclosure is equally applicable to both wireless and wireline services. Accordingly, while SIP and MMS specific messages and message sequences are described in the following examples, it is understood that they may be replaced by other messages and message sequences for implementations involving other technologies.

Referring to FIG. 1, a message sequence chart 100 illustrates exemplary messaging for a method of denying service to a user in a wireless or wireline network. A Multimedia Messaging Service (MMS) User Agent (UA) 102 is shown in communication with a Session Initiation Protocol (SIP) Registrar 104. In communication with both the MMS UA 102 and the SIP Registrar 104 is MMS Relay/Server 106.

The MMS UA 102 (which may be viewed as an MMS implementation of an Application User Agent (AUA) for any wireless or wireline IMS user) enables a wireless user to access MMS services. The MMS UA 102 may be implemented by hardware, software, firmware, or another suitable medium and may reside on a wireless mobile device. A wireless mobile device may include a mobile phone or other wireless-enabled devices, such as a Personal Digital Assistant (PDA), a personal computer, an automobile, or a two-way paging device, for example. Other devices on which an MMS UA 102 may reside include personal computers, workstations, servers, a network node, or other network, computer, or telecommunications systems or components. In some embodiments, the MMS UA 102 may communicate directly with the SIP registrar 104. In some embodiments, for example where the MMS UA 102 resides on a wireless mobile device, there may be interposing structures and equipment, as explained in greater detail below.

In those embodiments where the MMS UA 102 operates on an SIP-based network, the MMS UA 102 may be in communication with the SIP Registrar 104. The SIP Registrar 104 may serve to provide a login or authentication point when the MMS UA 102 operates on an SIP-based network. The SIP Registrar 104 may register the MMS UA 102 on the SIP-based network, allowing other users of the network to locate the user of the mobile device corresponding to the MMS UA 102. The SIP Registrar 104 may also serve as a node through which other network elements access the MMS UA 102 as explained in greater detail below. The SIP Registrar 104 may also provide a Public User Identification (PUI) of the MMS UA 102 to the other network elements. In some embodiments, there may be additional SIP devices or nodes associated with the SIP Registrar 104, such as an SIP proxy server (not shown) or an SIP redirect server (not shown). The SIP network itself may implemented independently of the transport layer, which may be based on Internet Protocol (IP), User Datagram Protocol (UDP), Transmission Control Protocol (TCP), and/or other standards. The SIP-based network may be implemented as a public network (e.g., the Internet), as a private network (e.g., an intranet), or as a combination of public and private networks.

The MMS Relay/Server 106 may provide multimedia messaging services to the MMS UA 102. The SIP Registrar 104 may serve to relay messages or services from the MMS Relay/Server 106 to the MMS UA 102, as described below. The MMS Relay/Server 106 may either act as a server, and route MMS messages from one MMS UA to another, or may act as a relay, possibly in communication with other MMS Relay/Servers to provide messaging or other services over an SIP based network.

In operation, the MMS UA 102 may send a registration request 110 to the SIP Registrar 104. If the registration request 110 is unauthorized, the SIP Registrar may return a notice of non-authorization, which may be an SIP "401 (unauthorized)" message 112. Upon receiving the "401 (unauthorized)" message 112, the MMS UA 102 may attempt registration again by providing credential information with message 114. The SIP Registrar 104 may then authenticate the MMS UA 102 on the SIP network and may send a registration request 116, which may include the PUI of the MMS UA 102, to the MMS Relay/Server 106.

In the event that the MMS Relay/Server determines to deny the registration 116, a response 118 is provided to the SIP Registrar 104. The response 118 may serve to inform the SIP Registrar 104 that MMS services have been denied to the MMS UA 102. The SIP Registrar 104 may then provide a response 120 to the MMS UA 102, which may indicate to the MMS UA 102 that MMS services for the MMS UA 102 have been denied.

Figure 2:
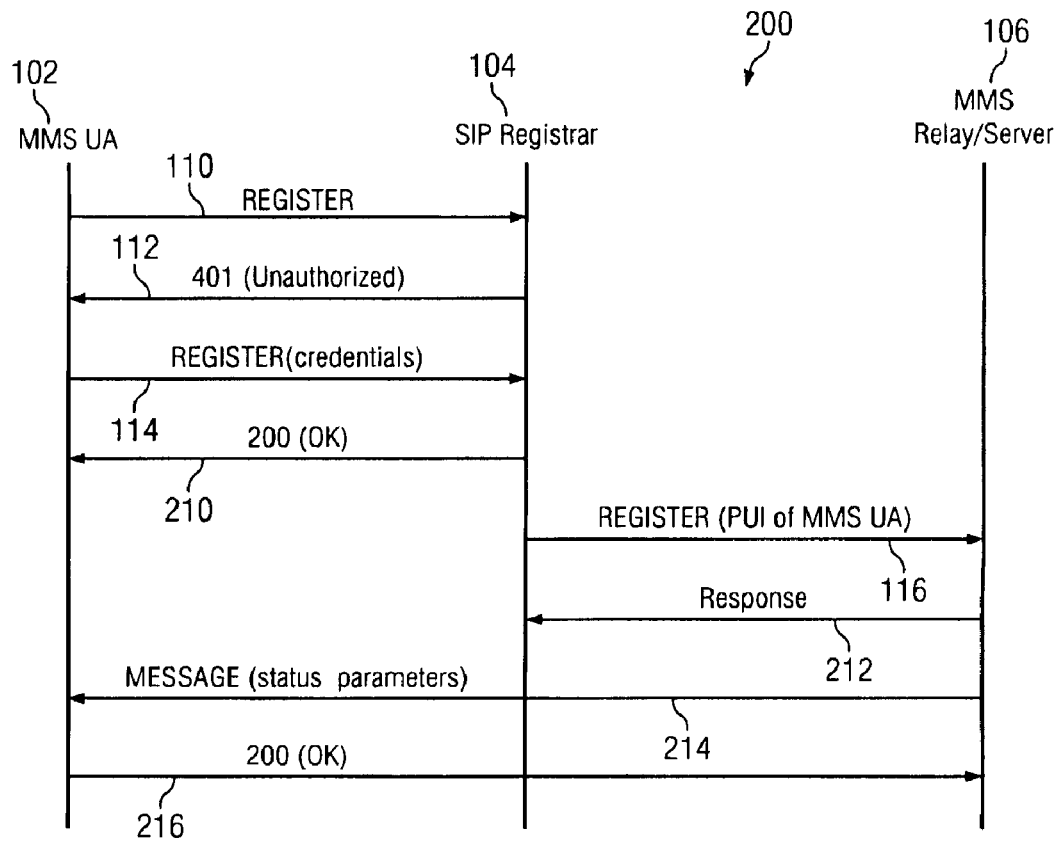
FIG. 2 illustrates a message sequence chart of another embodiment of a method for denying service to a user of a wireless network.

Referring to FIG. 2, a message sequence chart 200 illustrates exemplary messaging for a method of denying service to a user of a wireless network. An MMS UA 102, an SIP Registrar 104, and an MMS Relay/Server 106 are shown. These may be substantially similar or identical to the MMS UA 102, SIP Registrar 104, and MMS Relay/Server 106 described in reference to FIG. 1.

In operation, the MMS UA 102 may attempt to register with the SIP Registrar through message 110 and may be rejected as unauthorized by message 112, similar to the embodiment of FIG. 1. Another registration attempt 114 presenting credentials may be sent from the MMA UA 102 to the SIP Registrar 104. If the registration attempt is successful, the SIP Registrar 104 confirms registration of the MMS UA on the SIP network with message 210, which may be an SIP 200 (OK) message. The SIP Registrar 104 may attempt to register the MMA UA 102 with the MMS Relay/Server 106 with message 116, which may provide a PUI of the MMS UA.

In the event the MMS Relay/Server 106 determines to deny the registration request 116, a response 212 may be provided to the SIP Registrar. The response 212 may indicate to the SIP Registrar that MMS UA 102 has not been registered with the MMS Relay/Server 106. The MMS Relay/Server 106 may also send a message 214 to the MMS UA containing status parameters that may be set to indicate the status of services. The status parameters may include the PUI of the MMS UA, a uniform resource identifier (URI) corresponding to the SIP Registrar 104, and/or a URI corresponding to the MMS Relay/Server 106. The status parameters may indicate that multimedia messaging (MM) services have been denied to the MMS UA 102 or that the MMS UA 102 is allowed to invoke MM services. In some embodiments, more or less information may be included with the status parameters than described here. The MMS UA 102 may confirm receipt of the message 214 with confirmation 216. The confirmation message 216 may be an SIP "200 (OK)" message.

Figure 3:
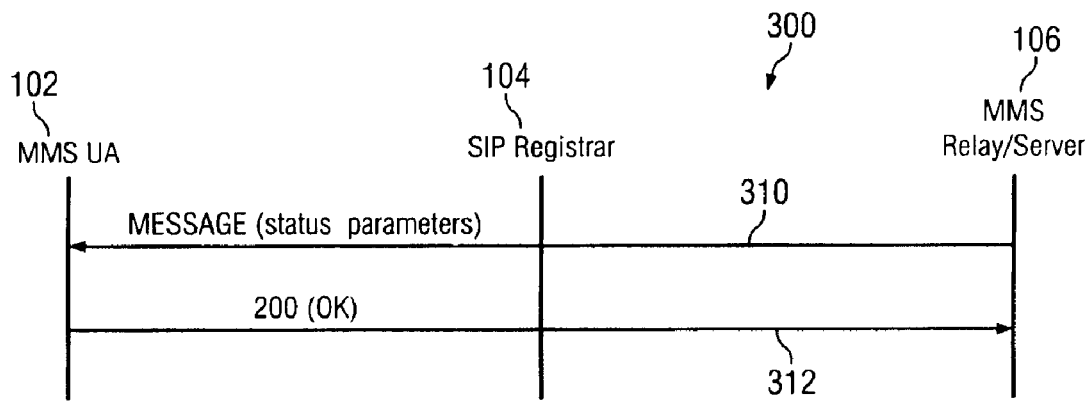
FIG. 3 illustrates a message sequence chart of one embodiment of a method for terminating service of a user of a wireless network.

Referring to FIG. 3, a message sequence chart 300 illustrates exemplary messaging for a method of terminating service to a user of a wireless network. An MMS UA 102, an SIP Registrar 104, and an MMS Relay/Server 106 are shown. These may be substantially similar or identical to the MMS UA 102, SIP Registrar 104, and MMS Relay/Server 106 described in reference to FIG. 1.

In operation, the MMS UA 102 may be registered on an SIP network by SIP Registrar 104. The MMS UA 102 may also be registered for services with the MMS Relay/Server 106. In the present example, the MMS Relay/Server determines to terminate services to the MMS UA 102. This information may be conveyed to the MMS UA 102 by a message 310, which may contain status parameters. As before, the status parameters may include information including, but not limited to, a PUI of the MMS UA 102, a URI corresponding to the SIP Registrar 104, a URI corresponding to the MMS Relay/Server 106. The status parameters will indicate termination of service to the MMS UA 102 by the MMS Relay/Server 106. In some embodiments, the MMS UA may confirm receipt of the message 310 by confirmation 312. The confirmation 312 may be an SIP "200 (OK)" message.

Figure 4:
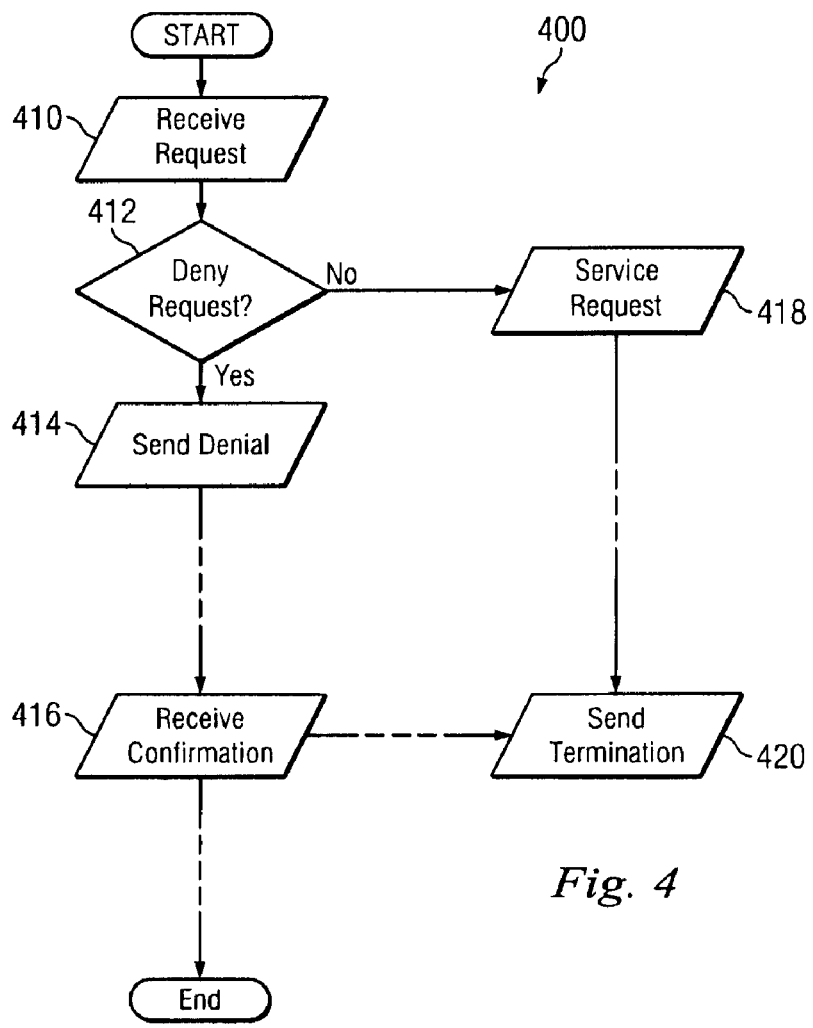
FIG. 4 is a flow chart illustrating one embodiment of a method for denying service to a user of a wireless network.

Referring to FIG. 4, in another embodiment, a method 400 may be used to deny or terminate one or more application services to a user of a wireless or wireline network. The application services may be MMS services as described previously or any other type of application service that may be provided on an SIP-based network with various transport layer options, such as an IP network. A request for services is received at step 410. The request may be received by an MMS Relay/Server, as previously described. A determination of whether to provide such services may be made at step 412, possibly by the MMS Relay/Server. The determination may be based on current network traffic or an account status, for example. If the request is denied at step 412, a message containing one or more status parameters indicating service has been denied may be sent at step 414. The message may be sent to the MMS UA, as previously described. In some embodiments, the recipient of the message containing status parameters indicating service has been denied may provide a confirmation at step 416.

If the request is granted at step 412, the MMS Relay/Server and/or other network components may proceed to service the request at step 418. If the MMS Relay/Server and/or other network components determine at some point to terminate servicing of requests (step 420), a termination notice may be sent at step 422. As before, the message may be sent to a network user via a user agent, such as a MMS UA and, in some embodiments, the recipient of the message containing status parameters indicating service has been denied may provide a confirmation at step 416. If service is not terminated, the method 400 may determine at step 424 whether the service has ended (or is in the process of ending). If the service is not ending, the method returns to step 418 where servicing of the request continues. Otherwise, the method ends. It is understood that various alterations to the method 400 may be made, with various steps executed in a different order (e.g., step 424 before step 420) or executed sequentially, combined, further divided, replaced with alternate steps, or removed entirely.

Figure 5:
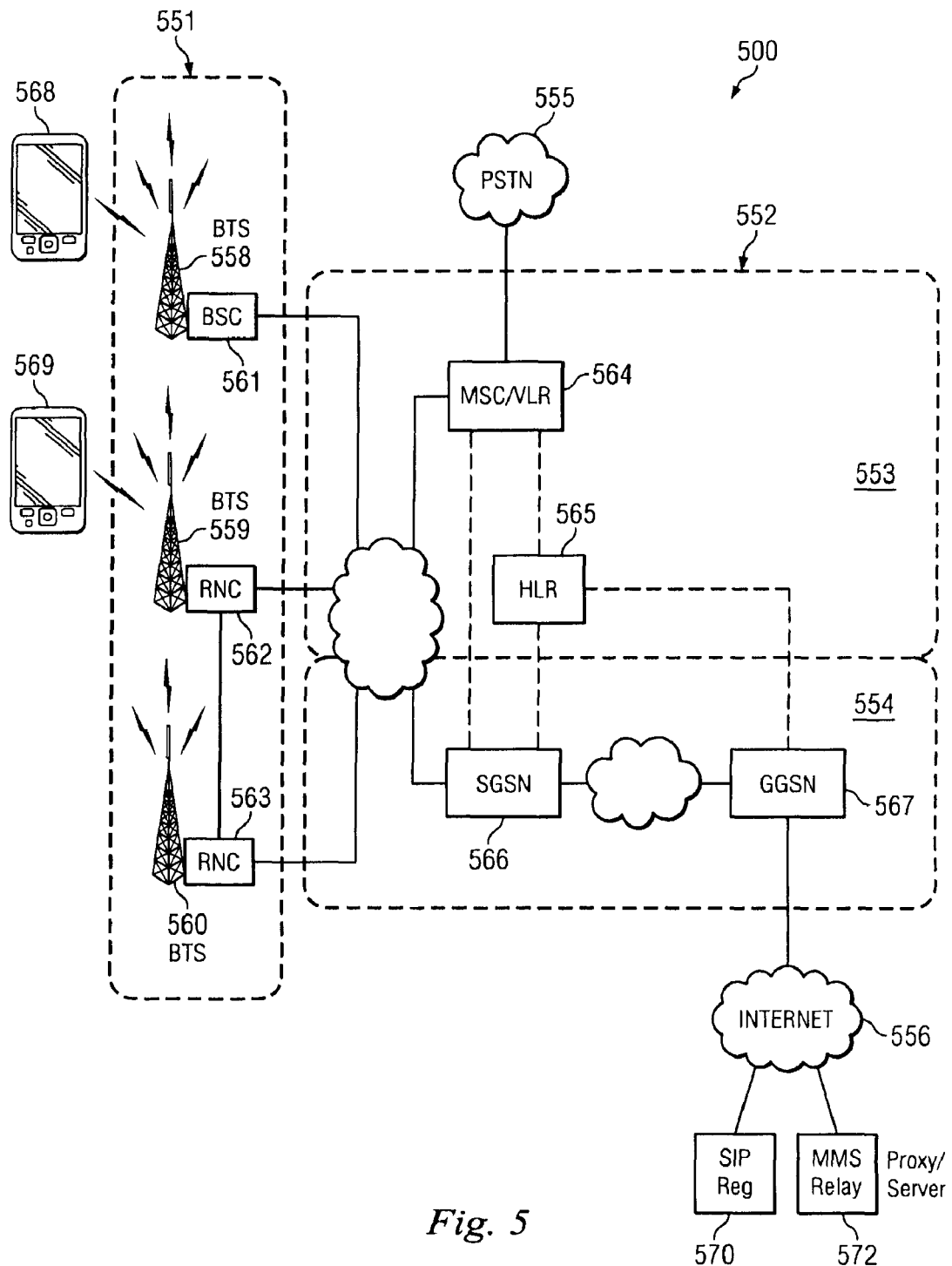
FIG. 5 illustrates a block diagram of one embodiment of a wireless network within which the message sequences of FIGS. 1-3 and method of FIG. 4 may be implemented.

FIG. 5 illustrates a block diagram of a telecommunications network 500 that illustrates an exemplary system within which the methods disclosed herein may be practiced. In the present example, the network 500 is a wireless network that supports both voice and data packet communications using General Packet Service Radio (GPRS) and Universal Mobile Telecommunications System (UMTS) technologies.

The network 500 comprises a Radio Access Network (RAN) 551 and a core network 552. The core network further comprises a circuit domain 553 and a packet domain 554. Other networks may be accessible to the network 500, such as a Public Switch Telephone Network (PSTN) 555 (connected to the circuit domain 553) and Internet 556.

The RAN 551 includes a plurality of cells (not shown) serviced by base transceiver stations (BTS) 558, 559, and 560. The BTS 558 is connected to a base station controller (BSC) 561 to provide a second-generation wireless network. The BTSs 559, 560 are accessible to radio network controllers (RNC) 562, 563, respectively, to provide a third-generation wireless network. A mobile switching center/visitor location register (MSC/VLR) 564 may be used to connect the core network 553 with other networks, such as the PSTN 555. A home location register (HLR) 565 may be accessible to the MSC/VLR 564 and also to a serving GPRS support node (SGSN) 566 and a gateway GPRS support node (GGSN) 567 in the packet domain 554.

The network 500 enables at least one mobile device 568 to establish a communication session with another device via the BTS 558. An MMS UA, as previously described, may reside on the mobile device 568. A request to establish a communication session by the mobile device 568 may be directed by the MSC/VLR 564 to (1) a second mobile device 569, (2) a voice terminal (not shown) coupled to the PSTN 555, or (3) a data terminal (not shown) coupled elsewhere to the telecommunications network 500. For example, if the communication session is a circuit data transfer session, the request may be to connect the mobile device 568 to a computer or other data device via the network 500. If the communication is a packet data transfer session, the request may be routed through the SGSN 566, the GGSN 567, and to the Internet 556. An SIP based network may interface with the SGSN 566 and/or the GGSN 567. It is noted that the mobile devices 568 and 569, while illustrated as mobile telephones, may be any mobile device capable of communicating via the network 500.

An SIP Registrar 570 may be connected to the Internet 556 and may utilize the Internet 556 using SIP over an IP transport layer. Similarly, an MMS Relay/Server may be connected to the Internet 556 using SIP with the Internet 556 as the IP transport layer. The SIP Registrar 570 and the MMS Relay/Server 572 may operate as previously described, both with one another, and with the MMS UA residing on the mobile device 568. It is understood that the network 500 is for purposes of illustration and the present disclosure may be equally applicable to other networks, including code division multiple access (CDMA), time division multiple access (TDMA) networks, and third generation wireless networks using SIP for both data and voice channels.

Those skilled in the art should appreciate that they may readily use the present disclosure as a basis for designing or modifying other processes and structures for carrying out the same purposes and/or achieving the same advantages of the embodiments introduced herein. For example, various steps of the described methods and sequences may be executed in a different order or executed sequentially, combined, further divided, replaced with alternate steps, or removed entirely. In addition, various functions illustrated in the methods or described elsewhere in the disclosure may be combined to provide additional and/or alternate functions. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A Multimedia Messaging Service (MMS) server comprising:
- a network interface operable to receive a MMS request from a Session Initiation Protocol (SIP) registrar for an application service via a transport network, the MMS request resulting from a credential led information request from a MMS user agent;
- a message processor coupled to the network interface and operable:
- to process the MMS request to determine whether the request should be denied; and
- upon determining that the MMS request should be denied:
- to provide a response corresponding to the denial of the request to the SIP registrar via the network interface and the transport network; and
- to provide a message to the MMS user agent corresponding to the denial of the request via the network interface and the transport network.

2. The MMS server of claim 1, wherein the network interface is operable to receive confirmation of the denial directly from the MMS user agent via the transport network.

3. The MMS server of claim 1, wherein the message provider is configured to provide a message to the MMS user agent by providing a message comprising parameters indicating the user's status to invoke the application service.

4. The MMS server of claim 3, wherein the parameters include at least one of a public user identity (PUI), a uniform resource identifier (URI) corresponding to a SIP registrar, a URI corresponding to a provider of a network device providing the application service, or a status parameter indicating that the application service has been denied to the user or that the user is allowed to invoke the application service.

5. The MMS server of claim 1, wherein the network interface is operable to interface with the transport network using SIP.

6. The MMS server of claim 1, wherein the network interface is operable to interface with a transport network comprising a SIP registrar configured to provide communication with at least the user or a user agent (UA) representing the user.

7. The MMS server of claim 1, wherein the network interface is operable to interface with a transport network comprising at least one of a public or a private network.

8. The MMS server of claim 1, wherein the application service comprises access to a Multimedia Messaging Service (MMS).

9. The MMS server of claim 1, wherein the message processor is operable to process a request for registration with an application server configured to provide the application service.

10. An internet protocol (IP) multimedia subsystem (IMS) registrar, comprising:
- a network interface and a message processor co-operable:
- to receive a registration request from an application user agent (AUA);
- to send a registration confirmation from the IMS registrar to the AUA and registering a user associated with the AUA on a transport network when the registration request provides proper credential information; and
- to send a notice of registration failure from the IMS registrar to the AUA when the registration request does not provide proper credential information.

11. The IMS registrar of claim 10, wherein the network interface and the message processor are further co-operable to forward a request for an application service received by the IMS registrar from the AUA to an application server when the registration request provides proper credential information.

12. The IMS registrar of claim 11, wherein the network interface and the message processor are further co-operable to receive a notice of denial from the application server.

13. A method of operating an internet protocol (IP) multimedia subsystem (IMS) registrar, the method comprising:
- receiving, with a computing device, a registration request from an application user agent (AUA);
- sending, using the computing device, a registration confirmation from the IMS registrar to the AUA and enabling registration of a user associated with the AUA on a transport network when the registration request provides proper credential information; and
- sending, using the computing device, a notice of registration failure from the IMS registrar to the AUA when the registration request does not provide proper credential information.

14. The method of claim 13, further comprising forwarding, using the computing device, a request for an application service received by the IMS registrar, from the AUA, to an application server when the registration request provides proper credential information.

15. The method of claim 14, further comprising receiving, using the computing device, a notice of denial from the application server.

* * * * *